(12) United States Patent
Sekino et al.

(10) Patent No.: US 8,381,831 B2
(45) Date of Patent: Feb. 26, 2013

(54) ROTARY IMPACT TOOL

(75) Inventors: Fumiaki Sekino, Hirakata (JP);
Kenichiro Inagaki, Hirakata (JP);
Yutaka Yamada, Osaka (JP); Hiroyuki Tsubakimoto, Ritto (JP)

(73) Assignee: Panasonic Electric Works Power Tools Co., Ltd., Shiga (JP)

( * ) Notice: Subject to any disclaimer, the term of this patent is extended or adjusted under 35 U.S.C. 154(b) by 373 days.

(21) Appl. No.: 12/656,343

(22) Filed: Jan. 27, 2010

(65) Prior Publication Data

US 2010/0186978 A1 Jul. 29, 2010

(30) Foreign Application Priority Data

Jan. 27, 2009 (JP) ................. 2009-015944

(51) Int. Cl.
*B25B 21/02* (2006.01)
(52) U.S. Cl. .......................... 173/48; 173/216
(58) Field of Classification Search .............. 173/47–48, 173/104, 216
See application file for complete search history.

(56) References Cited

U.S. PATENT DOCUMENTS

| | | | | |
|---|---|---|---|---|
| 4,274,023 A * | 6/1981 | Lamprey | .................. | 310/83 |
| 4,791,833 A * | 12/1988 | Sakai et al. | .................. | 475/299 |
| 6,457,535 B1 * | 10/2002 | Tanaka | .................. | 173/48 |
| 6,857,983 B2 * | 2/2005 | Milbourne et al. | .......... | 475/269 |
| 6,983,810 B2 * | 1/2006 | Hara et al. | .................. | 173/176 |
| 7,124,839 B2 * | 10/2006 | Furuta et al. | .................. | 173/104 |
| 7,223,195 B2 * | 5/2007 | Milbourne et al. | .......... | 475/298 |
| 7,308,948 B2 * | 12/2007 | Furuta | .................. | 173/48 |
| 7,380,612 B2 * | 6/2008 | Furuta | .................. | 173/29 |
| 2005/0199404 A1 * | 9/2005 | Furuta et al. | .................. | 173/48 |
| 2006/0090913 A1 | 5/2006 | Furuta | | |
| 2007/0251359 A1 | 11/2007 | Junkers et al. | | |
| 2008/0173459 A1 * | 7/2008 | Kuroyanagi et al. | ......... | 173/216 |

FOREIGN PATENT DOCUMENTS

| | | |
|---|---|---|
| EP | 1 050 381 | 11/2000 |
| EP | 1 574 294 | 9/2005 |
| JP | 2004-074311 | 3/2004 |
| JP | 2005-288682 | 10/2005 |
| JP | 2006-123080 | 5/2006 |

(Continued)

OTHER PUBLICATIONS

Japanese Office Action dated Oct. 12, 2010 and English summary thereof.

(Continued)

*Primary Examiner* — M. Alexandra Elve
*Assistant Examiner* — Andrew M Tecco
(74) *Attorney, Agent, or Firm* — Bacon & Thomas, PLLC

(57) ABSTRACT

A rotary impact tool includes a drive power source for producing rotational power, a drive shaft driven by the rotational power supplied from the drive power source, an output shaft operatively connected to the drive shaft for receiving the rotational power, an impact mechanism operatively couplable with the drive shaft. The rotary impact tool further includes a changeover unit for changing over an impact mode in which the impact mechanism is operated and a drill driver mode in which the rotational power produced by the drive power source is transferred to the output shaft without operating the impact mechanism and a multi-stage speed reduction mechanism for transferring the rotational power produced by the drive power source to the output shaft through the drive shaft at variable speeds in at least three speed modes including a low speed mode, a middle speed mode and a high speed mode.

12 Claims, 9 Drawing Sheets

FOREIGN PATENT DOCUMENTS

| | | |
|---|---|---|
| JP | 2006-123081 | 5/2006 |
| JP | 3911905 | 5/2007 |
| JP | 2007-296630 | 11/2007 |
| JP | 2008-173739 | 7/2008 |

OTHER PUBLICATIONS

Extended European search report dated Mar. 7, 2011.

* cited by examiner

ROTARY IMPACT TOOL

FIELD OF THE INVENTION

The present invention relates to a rotary impact tool and, more specifically, to a rotary impact tool capable of changing over an impact mode and a drill driver mode.

BACKGROUND OF THE INVENTION

Conventionally, there is known a multi-purpose rotary impact tool capable of changing over an impact mode in which bolts, nuts or screws are tightened by an impact mechanism having a hammer and an anvil and a drill driver mode in which drilling tasks such as pilot hole forming and screw tightening are performed while restraining the impact operation of the impact mechanism.

When drilling operations or other operations are carried out in the drill driver mode, it is necessary to reduce the operation speed to a value smaller than available in the impact mode in order to prevent occurrence of cracks or other trouble in a drill bit. In addition to the impact mechanism being restrained or released when changing over the respective modes, the speed reduction ratio is changed in each of the modes.

For example, Japanese Patent No. 3911905 (Patent Document 1) discloses a rotary impact tool that can be changed over between a low speed mode in which a planetary reduction mechanism operates and a high speed mode in which the planetary reduction mechanism does not operate. The high speed mode is used as an impact mode and the low speed mode as a drill driver mode.

Japanese Patent Laid-open Publication No. 2005-288682 (Patent Document 2) discloses a rotary impact tool in which a high speed mode can be changed between an impact mode and a drill driver mode depending on whether an impact mechanism is restrained or released. Thus, the drill driver mode can be changed between two different speed modes, i.e., a low speed mode for drilling purposes and a high speed mode for screw-tightening purposes.

However, the drill driver mode of the rotary impact tool disclosed in Patent Document 1 lies generally halfway between a high speed mode and a low speed mode available in a drill-driver-single-function rotary tool, such as an electric drill or the like. For that reason, the rotary impact tool disclosed in Patent Document 1 poses a problem in that the screw tightening speed thereof is slower than that available in the high speed mode of the single-function rotary tool. Another problem resides in that the rotary impact tool cannot perform an operation of drilling large-diameter holes as is available in the low speed mode of the single-function rotary tool.

With the rotary impact tool of Patent Document 2 in which the drill driver mode can be changed between two different speed modes, the performance in the low speed mode does not substantially differ from the performance in the low speed mode achieved by the rotary impact tool disclosed in Patent Document 1. Therefore, the rotary impact tool of Patent Document 2 cannot perform an operation of drilling large-diameter holes. Since the speed reduction ratio in the high speed drill driver mode is the same as that available in the impact mode, the rotary impact tool is apt to come into a locked state if the load thereof is increased during a heavy tightening operation or other operations. This makes it difficult to use the rotary impact tool.

SUMMARY OF THE INVENTION

In view of the above, the present invention provides a rotary impact tool operable both in an impact mode having at least one speed and in a drill driver mode having two or more speeds and a reduction ratio different than that of the impact mode, the performance of the rotary impact tool in the drill driver mode being substantially equivalent to the performance available in high speed and low speed modes of a drill-driver-single-function rotary tool, the rotary impact tool being designed to minimize the increase in the size of a speed changer mechanism to thereby improve the ease of use of the rotary impact tool in the drill driver mode.

In accordance with a first aspect of the present invention, there is provided A rotary impact tool including: a drive power source for producing rotational power; a drive shaft driven by the rotational power supplied from the drive power source; an output shaft operatively connected to the drive shaft for receiving the rotational power; an impact mechanism operatively couplable with the drive shaft, the impact mechanism including a hammer and an anvil; a changeover unit for changing over an impact mode in which the impact mechanism is operated and a drill driver mode in which the rotational power produced by the drive power source is transferred to the output shaft without operating the impact mechanism; and a multi-stage speed reduction mechanism for transferring the rotational power produced by the drive power source to the output shaft through the drive shaft at variable speeds in at least three speed modes including a low speed mode, a middle speed mode and a high speed mode, wherein the multi-stage speed reduction mechanism includes at least two planetary speed changer units shiftable between a reduction state and a non-reduction state and at least one speed reducer unit operable in a reduction state at all times, one of the three speed modes being used as the impact mode, the remaining two of the three speed modes being used as the drill driver mode, the three speed modes being established through speed reduction operations of two or more stages in which the speed reducer unit and at least one of the speed changer units are kept in the reduction state.

With this configuration, the respective modes can be set to have the reduction ratios resulting from the reduction operation performed in two or more stages. Furthermore, two or more speeds become available in the drill driver mode with the reduction ratios differing from that of the impact mode.

With such configuration, it is possible to realize at least three speeds, one of which is allotted to the impact mode and the remaining two of which are allotted to the drill driver mode. Thus, the drill driver mode of the present rotary impact tool is substantially the same as the drill driver mode of the conventional drill-driver-single-function rotary tool for use in tightening screws and drilling large-diameter holes. This helps enhance the ease of use of the present rotary impact tool. Since two-stage speed reduction is performed by the speed reducer unit and the speed changer units in the impact mode, it is possible to obtain a reduction ratio greater than the reduction ratio of from about 1/7 to 1/8 available in the conventional impact mode in which speed reduction is performed in a single stage. This makes it possible to use a motor whose torque is smaller than that of the conventional motor, which assists in reducing the size of the motor. In addition, the outer diameter of the multi-stage speed reduction mechanism can be made smaller than that of the conventional mechanism in which the reduction ratio comparable to that of the present invention is achieved by single-stage reduction. This helps minimize the increase in size.

In the rotary impact tool, one of the two planetary speed changer units may come into the reduction state in the middle speed mode and the other may come into the reduction state in the high speed mode, the speed ratio between the high speed mode and the middle speed mode being set equal to the ratio between the reduction ratios of the two planetary speed changer units.

With such configuration, the speed changer unit coming into the reduction state in the high speed mode differs from the speed changer unit coming into the reduction state in the middle speed mode. Thus, the speed ratio between the high speed mode and the middle speed mode is equal to the ratio between the reduction ratios of the speed changer units used in the respective modes. This makes it possible to easily set the reduction ratios in the respective modes. Accordingly, it is possible to set the drill driver mode with a reduction ratio closer to that of the conventional drill-driver-single-function rotary tool. This improves the ease of use of the rotary impact tool in the drill driver mode.

In the rotary impact tool, the planetary speed changer unit coming into the reduction state in the middle speed mode may includes a IV-type planetary gear unit having a sun gear, a ring gear and a stepped planetary gear, the stepped planetary gear including a large-diameter gear portion and a small-diameter gear portion, the large-diameter gear portion differing in teeth number and outer diameter from the small-diameter gear portion, the large-diameter gear portion engaging with the sun gear, the small-diameter gear portion engaging with the ring gear.

With such configuration, the speed changer unit coming into the reduction state in the middle speed mode, the reduction ratio of which needs to be greater than that of the speed changer unit coming into the reduction state in the high speed mode, is formed of a IV-type planetary gear unit. Therefore, the planetary gear of the speed changer unit coming into the reduction state in the middle speed mode is formed of a stepped planetary gear. This makes it possible to realize an increased reduction ratio without having to reduce the size of the sun gear or to increase the outer diameter of the ring gear. Accordingly, it is possible to prevent the increase in the outer diameter of the speed changer units which would otherwise be required to secure the strength of the sun gear. This assists in minimizing the increase in the size of the rotary impact tool.

In the rotary impact tool, the speed reducer unit may be a first planetary reduction unit arranged near the drive power source in the multi-stage speed reduction mechanism.

With such configuration, the speed reducer unit performing no speed changing operation is used as a first planetary reduction unit that directly receives torque from a motor and rotates at an increased speed. Therefore, the respective gears of the first planetary reduction unit are not shifted when changing over the modes. This makes it possible to prevent occurrence of gear damage or other problems during the mode changing operation, thereby improving the ease of use of the rotary impact tool.

In the rotary impact tool, the changeover unit may include engagement portions respectively provided in the anvil and the drive shaft engaging with the hammer and a connector member arranged to engage with the engagement portions, and wherein the drill driver mode and the impact mode are changed over by changing over a state in which the connector member engages with the engagement portions to interconnect the anvil and the drive shaft against relative rotation and a state in which the connector member does not engage with at least one of the engagement portions.

With such configuration, the impact mode can be easily converted to the drill driver mode by bringing the connector member into engagement with the engagement portions to interconnect the anvil and the drive shaft against relative rotation. Since the torque is transferred to the output shaft without passing through the hammer, it is possible to deactivate the impact mechanism in the drill driver mode. This helps simplify the configuration of the changeover unit used in changing over the impact mode and the drill driver mode. Accordingly, it is possible to prevent the increase in the size of the rotary impact tool, which would otherwise occur when the changeover unit becomes complex. It is also possible to easily perform the changeover operation of the modes and to improve the ease of use of the rotary impact tool.

In the rotary impact tool, at least one of the speed changer units may be kept in the non-reduction state in the impact mode, the speed changer unit may be kept in the non-reduction being a final planetary reduction unit arranged near the output shaft in the multi-stage speed reduction mechanism, the final planetary reduction unit may be including a sun gear connected to the connector member of the changeover unit through an intermediate transfer member.

With such configuration, the final planetary reduction unit is brought into the non-reduction state by releasing the engagement between the sun gear and the planetary gear when the drill driver mode is converted to the impact mode. This prevents the final planetary reduction unit from making rotational movement. Therefore, even if the clutch mechanism for use in the drill driver mode is arranged in the final planetary reduction unit of the multi-stage speed reduction mechanism, it is possible to readily deactivate the clutch mechanism only by the changeover operation. This eliminates the need to perform a plurality of changeover operations, thereby improving the ease of use of the rotary impact tool. Furthermore, there is no need to additionally provide a unit for deactivating the clutch mechanism. This makes it possible to minimize the increase in the size of the rotary impact tool.

In the rotary impact tool, the final planetary reduction unit may be kept in the non-reduction state in the impact mode includes the IV-type planetary gear unit, the small-diameter gear portion being arranged on the output side of the IV-type planetary gear unit.

With such configuration, the IV-type planetary gear unit whose reduction ratio can be made greater without increasing the outer diameter thereof is brought into the non-reduction state in the impact mode. This makes it possible to set the high speed mode as the impact mode while setting the low speed mode and the middle speed mode as the drill driver mode. Furthermore, it is possible to set the reduction ratio of the drill driver mode closer to that of the conventional drill-driver-single-function rotary tool. In addition, the speed ratio of the drill driver mode to the impact mode can be set into a speed ratio that permits easier use of the rotary impact tool. Since the small-diameter gear portion is arranged on the output side, so is the ring gear of the final planetary reduction unit. Thanks to this feature, it is possible to easily assemble the final planetary reduction unit even when the clutch mechanism is assembled first.

In the rotary impact tool, the ratio between the teeth number of the small-diameter gear portion and the teeth number of the large-diameter gear portion of the stepped planetary gear may be set equal to 1:natural number.

With such configuration, the teeth numbers of the large-diameter gear portion and the small-diameter gear portion can be grasped with ease. This eliminates the need to adjust the positions of teeth when the small-diameter gear portion is coupled to the ring gear. Accordingly, it is possible to easily carry out the assembling work.

In the rotary impact tool, the changeover unit may include engagement portions respectively provided in the anvil and the hammer and a connector member arranged to engage with the engagement portions, and wherein the drill driver mode and the impact mode are changed over by changing over a state in which the connector member engages with the engagement portions to keep the impact mechanism against relative rotation and a state in which the connector member does not engage with at least one of the engagement portions.

With such configuration, the impact mechanism can be held against rotation merely by interconnecting the hammer and the anvil against relative rotation. This makes it possible to simplify the configuration of the changeover unit used in changing over the impact mode and the drill driver mode. Accordingly, it is possible to prevent the increase in the size of the rotary impact tool, which would otherwise occur when the changeover unit becomes complex. It is also possible to easily perform the changeover operation of the modes and to improve the ease of use of the rotary impact tool.

In the rotary impact tool, the ratio between the number of the stepped planetary gear, the teeth number of the ring gear and the teeth number of the sun gear may be set equal to 1:natural number:natural number.

With such configuration, the relative angles between the small-diameter gear portion and the large-diameter gear portion of all of the stepped planetary gears are made equal. This makes it possible to use the stepped planetary gears in common.

In the rotary impact tool, the small-diameter gear portion and the large-diameter gear portion of the stepped planetary gear may be formed independently of each other so that the relative angle between the small-diameter gear portion and the large-diameter gear portion becomes adjustable.

With such configuration, the large-diameter gear portion is formed independently of the small-diameter gear portion. Therefore, the reduction ratio of the IV-type planetary gear unit can be changed merely by changing the teeth number and module of the sun gear and the large-diameter gear portion. Inasmuch as the relative angle between the small-diameter gear portion and the large-diameter gear portion is adjustable, it is possible to easily provide a planetary gear differing in relative angle from other planetary gears. This makes it possible to easily assemble the IV-type planetary gear unit.

In the rotary impact tool, the three speed modes of the multi-stage speed reduction mechanism may be changed over in the order of the middle speed mode, the low speed mode and the high speed mode.

With such configuration, the modes are changed over in the order of the middle speed mode, the low speed mode and the high speed mode. Thus, the impact mode and the drill driver low mode used in drilling large-diameter holes are always changed over one next the other. This provides an easy-to-use rotary impact tool capable of performing the changeover operation in the order of the magnitude of torque outputted from the main body.

DETAILED DESCRIPTION OF THE PREFERRED EMBODIMENTS

Figure 1:
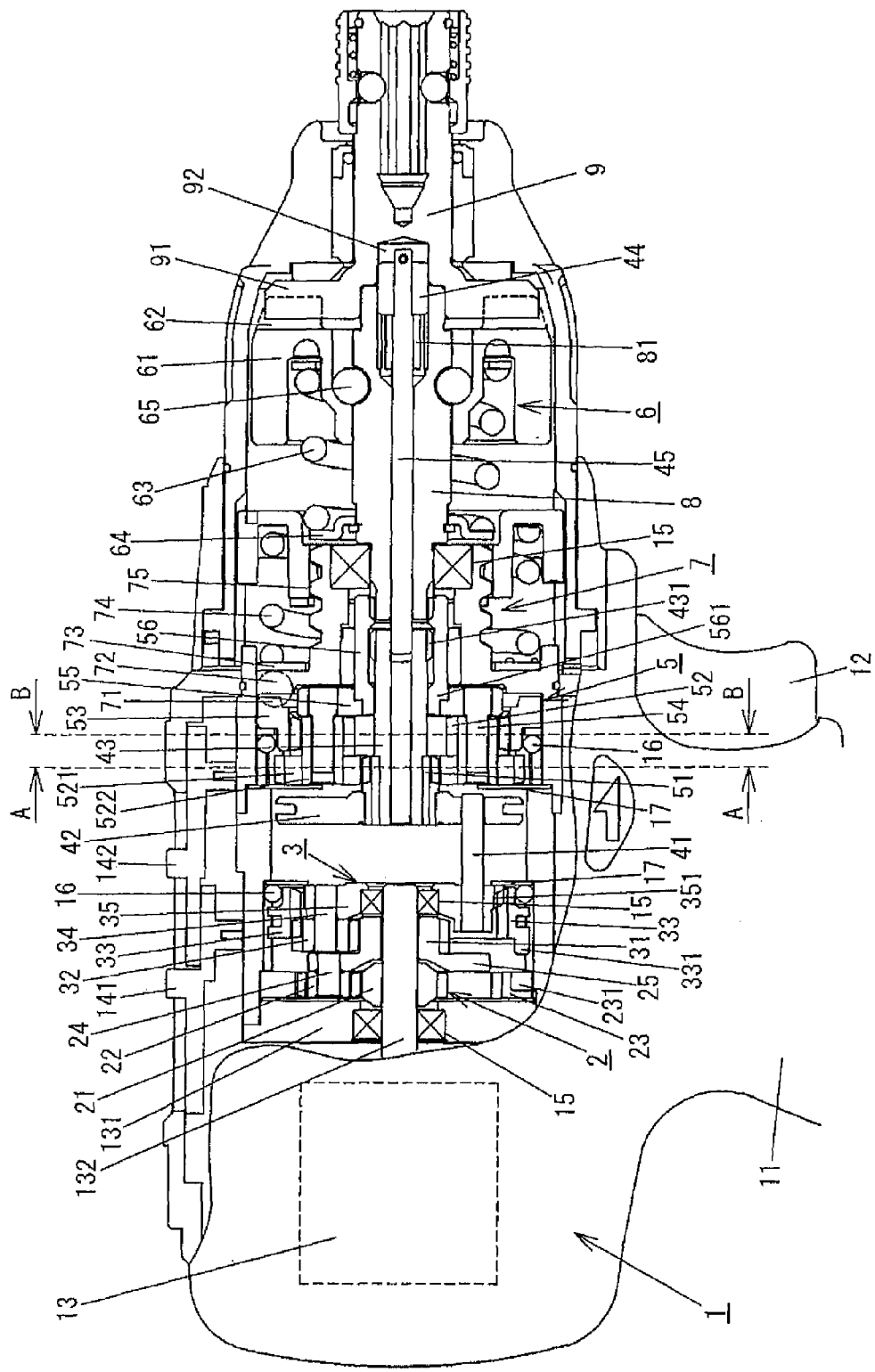
FIG. 1 is a partial section view showing a rotary impact tool in accordance with a first embodiment of the present invention, which is kept in a middle speed mode.

Hereinafter, embodiments of the present invention will be described with reference to the accompanying drawings.

A multi-purpose rotary impact tool of the present invention is operable in an impact mode in which an impact mechanism 6 including a hammer 61 and an anvil 91 is used and in a drill driver mode in which an output shaft 9 is rotated without causing any impact operation to the impact mechanism 6. The impact mode and the drill driver mode can be changed over by a changeover unit which in turn is externally operated through the use of a shift operation unit 14.

As shown in FIG. 1, the multi-purpose rotary impact tool in accordance with a first embodiment of the present invention is of a portable type driven by a built-in power source (not shown). In the rotary impact tool, the output power of a motor 13 is transferred to a drive shaft 8 through a multi-stage speed reduction mechanism. An impact output power is applied from the drive shaft 8 to the output shaft 9 through an impact mechanism 6. In the following description, the side on which the motor 13 lies along the axis of the drive shaft 8 will be referred to as "rear" and the side on which the output shaft 9 lies will be called "front".

The built-in power source is accommodated within a grip portion 11 extending from a housing 1 which forms a shell of the rotary impact tool. A trigger handle 12, a switch for operating the motor 13, is arranged near the root area of the grip portion 11.

Just like the conventional ones, the impact mechanism 6 includes the drive shaft 8, a hammer 61, an anvil 91, a biasing spring 63 for biasing the hammer 61 toward the anvil 91 and a spring rest 64 for supporting the rear end of the biasing spring 63.

More specifically, steel balls 65 are allowed to engage with a groove-shaped cam defined on the outer circumferential surface of the drive shaft 8 and a groove-shaped cam defined on the inner circumferential surface of the hammer 61. Thus, the hammer 61 can rotate together with rotation of the drive shaft 8. During rotation of the hammer 61, the protrusion 62 extending forwards from the hammer 61 comes into engagement with the anvil 91, thereby rotating the anvil 91 and the output shaft 9. As the torque of the output shaft 9 increases, the hammer 61 rotates with respect to the drive shaft 8 and moves backwards against the biasing spring 63 along the lead lines of the cams.

If the protrusion 62 rides over the anvil 91, the hammer 61 is moved forwards along the lead lines of the cams by the biasing force of the biasing spring 63. As a result, the protrusion 62 applies a rotational striking impact to the anvil 91.

A multi-stage speed reduction mechanism is arranged between the drive shaft 8 and the motor 13. The speed reduction mechanism includes a plurality of planetary reduction units having different speed reduction ratios. The rotational movement transferred to the output shaft 9 can be changed at a plurality of speed values by combining the reduction state and non-reduction state of the planetary reduction units.

For example, the rotary impact tool of the present embodiment includes first, second and third planetary reduction units 2, 3 and 5. The first planetary reduction unit 2 works as a speed reducer unit at all times but the second and third planetary reduction units 3 and 5 serve as speed changer units that can change over a reduction state and a non-reduction state.

By changing the state of the speed changer units, it becomes possible to perform a speed changing operation in three different speed modes, namely high-speed and middle-speed modes in which only one of the speed changer units remains in the reduction state and a low-speed mode in which the speed changer units are all kept in the reduction state.

The first planetary reduction unit 2 includes a first sun gear 21 fixed to an input shaft 132 rotated by the motor 13, a first ring gear 23 fixed to a motor base 131 through which the motor 13 is supported on the housing 1, and a plurality of first planetary gears 22 engaging with both the first sun gear 21 and the first ring gear 23. Since the first ring gear 23 is fixed to the motor base 131, the first planetary reduction unit 2 serves always to reduce the speed of the rotational movement transferred from the motor 13.

First transfer shafts 24 are fixedly secured to the respective first planetary gears 22. The rotational movement of reduced speed is transferred to a first carrier 25 through the first transfer shafts 24. A second sun gear 31 of the second planetary reduction unit 3 is provided at the side of the first carrier 25 near the drive shaft 8.

The second planetary reduction unit 3 is a speed changer unit that includes the second sun gear 31 arranged in a concentric relationship with the first sun gear 21 of the first planetary reduction unit 2, an axially-slidable second ring gear 33, and a plurality of second planetary gears 32 engaging with both the second sun gear 31 and the second ring gear 33. Second transfer shafts 34 through which to transfer torque to a second carrier 35 are fixed to the respective second planetary gears 32. The second carrier 35 is rotatably supported on the input shaft 132 through a bearing 15.

The second ring gear 33 can be axially slid between two positions, namely a rear position adjacent to the motor and a front position near the drive shaft 8. The position of the second ring gear 33 is changed by operating a second shift handle 141 of the shift operation unit 14 provided in the housing 1, and axially sliding the second ring gear 33 through a second shift spring (not shown).

More specifically, if the second ring gear 33 is in the front position as shown in FIG. 1, the second ring gear 33 engages with the external gear 351 of the second carrier against relative rotation. Accordingly, the second planetary reduction unit 3 rotates as a unit in a non-reduction state in which the second planetary reduction unit 3 does not perform any speed reduction function.

Figure 2:
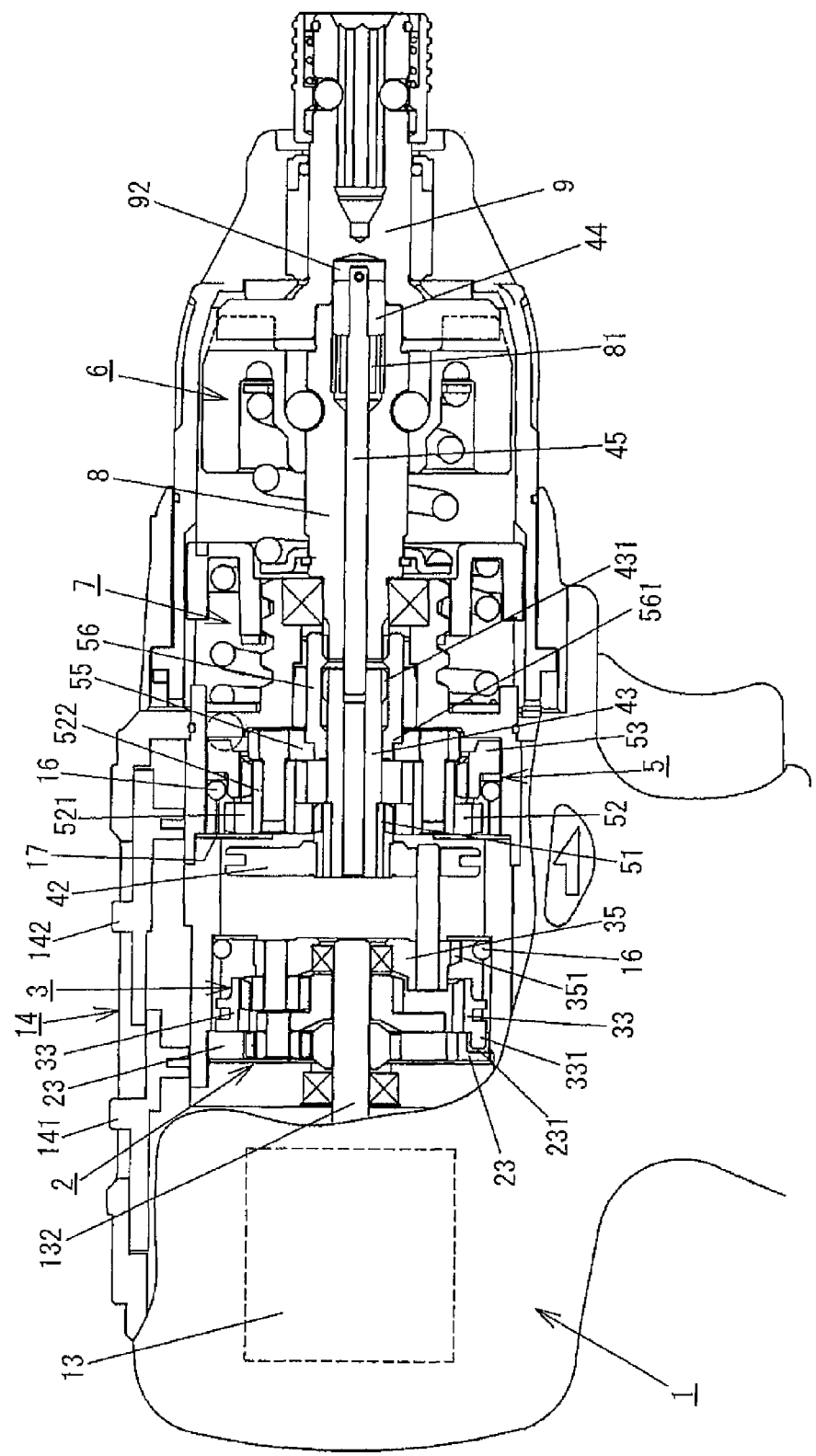
FIG. 2 is a partial section view of the rotary impact tool in a low speed mode.

If the second ring gear 33 is brought into the rear position by moving the second shift handle 141 backwards as shown in FIG. 2, the second ring gear 33 disengages from the external gear 351 of the second carrier 35. At this time, the engagement portion 331 axially extending from the second ring gear 33 engages with the engagement portion 231 of the first ring gear 23 against relative rotation.

Inasmuch as the second ring gear 33 is held in the first ring gear 23 against rotation upon the mutual engagement of the engagement portions 231 and 331, the second planetary reduction unit 3 comes into a reduction state in which the second planetary reduction unit 3 performs a speed reduction function. If the second shift handle 141 is moved forwards, the engagement portions 231 and 331 are disengaged from each other. Thus, the second planetary reduction unit 3 returns to the non-reduction state shown in FIG. 1.

As stated above, the second planetary reduction unit 3 is a speed changer unit capable of changing over the non-reduction state and the reduction state and consequently changing the speed of the rotational movement transferred from the motor 13. Retainer pins 16 are provided on the front side of the second ring gear 33 to decide the position of the second ring gear 33, when the second ring gear 33 is moved into the front position, and to prevent the second ring gear 33 from being removed forwards.

The second carrier 35 includes a plurality of power transfer pins 41 axially protruding forwards, i.e., toward the drive shaft 8. A power transfer carrier 42 is coupled with the power transfer pins 41 so that it can make sliding movement forwards and backwards along the axes of the power transfer pins 41.

The power transfer carrier 42 is axially slidable between a rear position nearer to the motor 13 and a front position nearer to the drive shaft 8. The torque of the second carrier 35 is transferred to the power transfer carrier 42 through the power transfer pins 41 regardless of the position of the power transfer carrier 42.

The sliding movement of the power transfer carrier 42 is caused through a third shift spring (not shown) by operating a third shift handle 142 of the shift operation unit 14 provided in the housing 1.

In the shift operation unit 14, the third shift handle 142 and the second shift handle 141 are designed to restrain each other's movement. This prevents simultaneous operation of the shift handles 141 and 142 and concurrent occurrence of speed changes in the speed changer units. That is to say, the shift operation unit 14 is configured to perform the speed changing operation step by step.

More specifically, the movement of the third shift handle 142 is restrained by the second shift handle 141 in the state shown in FIG. 1. Thus, only the second shift handle 141 is allowed to operate.

Figure 3:
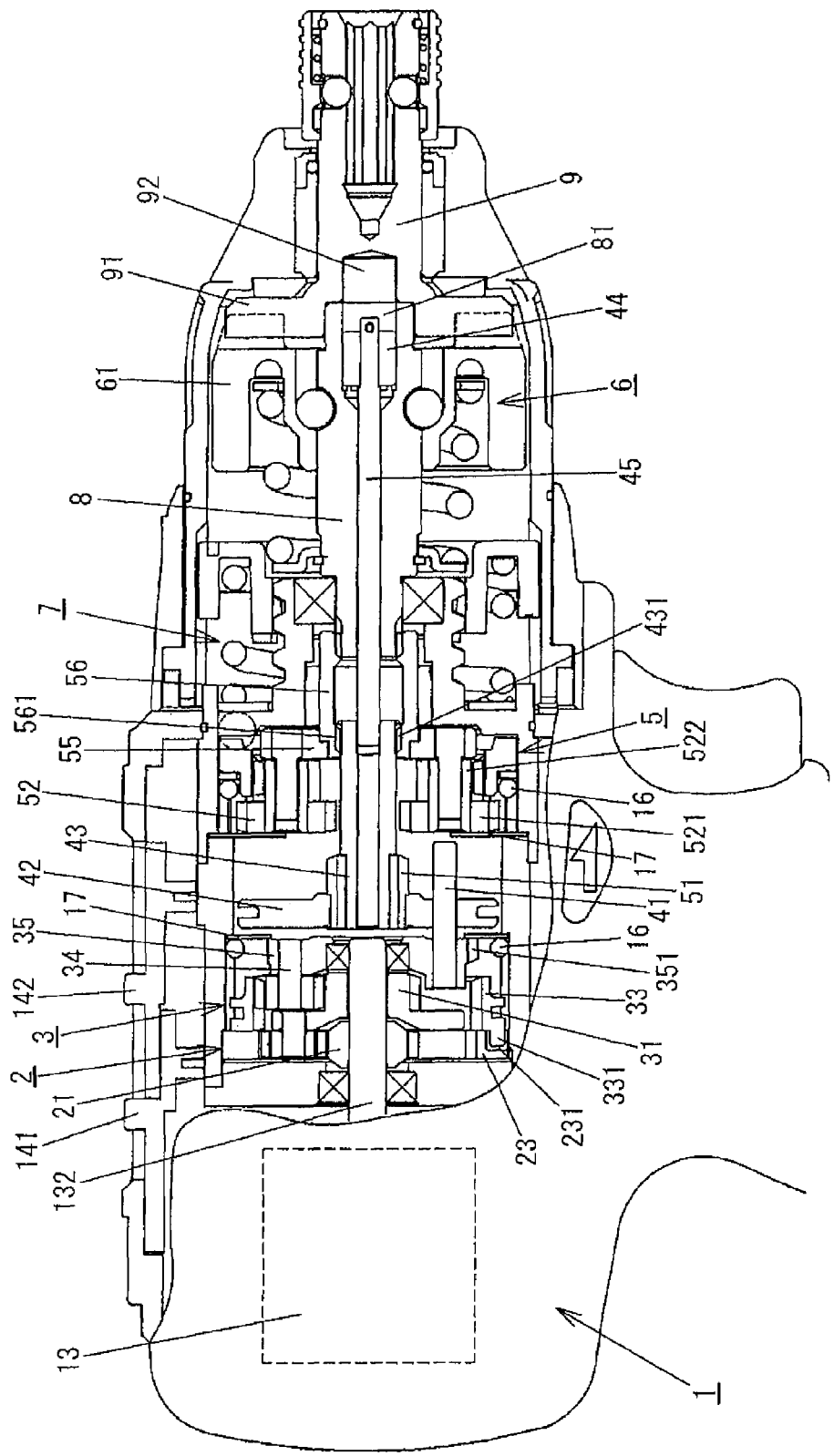
FIG. 3 is a partial section view of the rotary impact tool in a high speed mode.

In the state shown in FIG. 3, the movement of the second shift handle 141 is restrained by the third shift handle 142. Thus, only the third shift handle 142 is allowed to operate.

The second shift handle 141 and the third shift handle 142 are all operable in the state shown in FIG. 2, which is the middle state between the two states shown in FIGS. 1 and 3. If one of the second shift handle 141 and the third shift handle 142 is operated, the state shown in FIG. 1 or 3 becomes available. Thus, only one of the second shift handle 141 and the third shift handle 142 can be operated.

The third planetary reduction unit 5 includes a third sun gear 51 fixedly secured to the front side of the power transfer carrier 42.

The third planetary reduction unit 5 further includes a plurality of third planetary gears 52. The third sun gear 51 engages with the third planetary gears 52 when the power transfer carrier 42 is in the front position. If the power transfer carrier 42 moves into the rear position, the third sun gear 51 is disengaged from the third planetary gears 52. This means that the third planetary reduction unit 5 is a speed changer unit shifted in response to the movement of the power transfer carrier 42.

The third planetary reduction unit 5 further includes a third ring gear 53. Each of the third planetary gears 52 is a stepped planetary gear that includes a large-diameter gear portion 521 engaging with the third sun gear 51 and a small-diameter gear portion 522 engaging with the third ring gear 53, the small-diameter gear portion 522 being smaller in diameter than the large-diameter gear portion 521. The third planetary reduction unit 5 is a so-called IV-type planetary gear unit belonging to a 2K-H type planetary reduction mechanism.

Figure 4A:
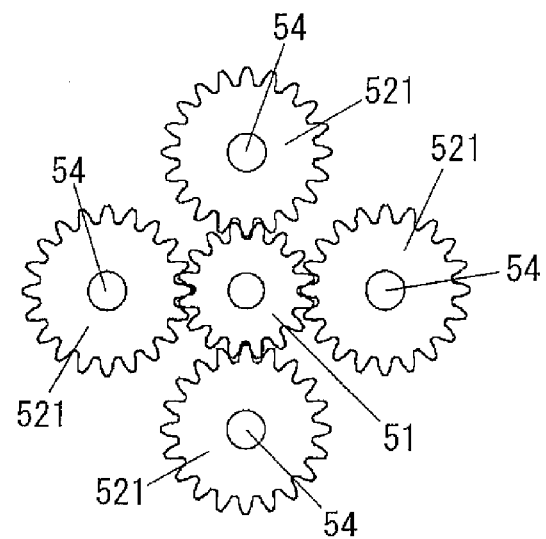
FIGS. 4A through 4C illustrate a third planetary reduction unit, FIG. 4A being a section view taken along line A-A in FIG. 1, FIG. 4B being a section view taken along line B-B in FIG. 1, and FIG. 4C being a view obtained by superimposing FIG. 4A on FIG. 4B.
Figure 4B:
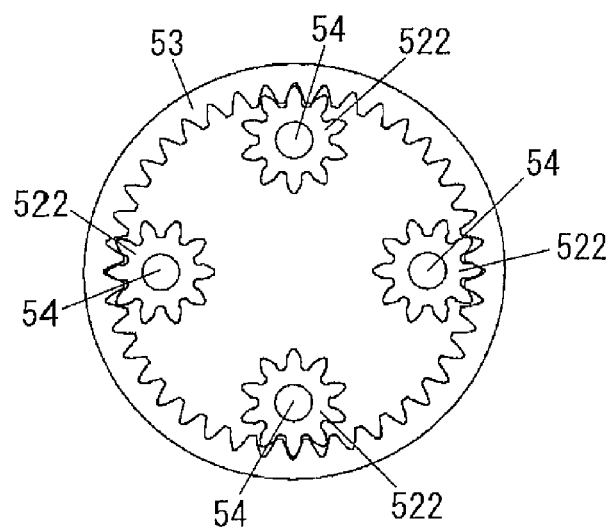
Figure 4C:
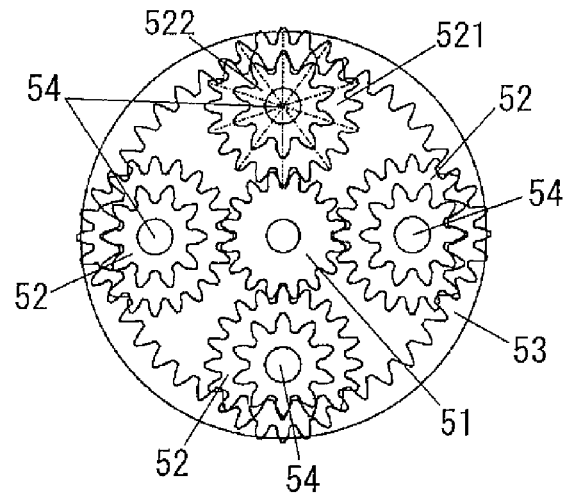

Referring to FIGS. 4A through 4C, each of the third planetary gears 52 is a two-stage external gear in which the large-diameter gear portion 521 and the small-diameter gear portion 522 are concentrically coupled together against relative rotation. Third transfer shafts 54 for transferring power to a third carrier 55 are fixedly secured to the axes of rotation of the third planetary gears 52, respectively.

A clutch mechanism 7 is arranged on the output side of the third planetary reduction unit 5. The clutch mechanism 7 is of a conventional type including a plurality of clutch ridges 71 provided on the front side of the third ring gear 53, a plurality of steel balls 72 positioned between the clutch ridges 71, a thrust plate 73 remaining in contact with the steel balls 72, a clutch spring 74 for biasing the steel balls 72 through the thrust plate 73 and a clutch adjusting thread member 75.

The clutch mechanism 7 has the same function as that of the conventional one. If the torque applied to the third ring gear 53 exceeds a predetermined value, the clutch ridges 71 push the steel balls 72 forwards to bring the third ring gear 53 into an idle state. The third carrier 55 stops its rotation as the third ring gear 53 runs idle. This prevents the rotary impact tool from suffering from damage, which would otherwise occur when an excessively high load acts in the drill driver mode. If the clutch mechanism 7 works in the impact mode, there is a possibility that the impact mechanism 6 cannot normally perform its striking operation.

Retainer pins 16 are provided on the rear side of the third ring gear 53 to prevent the third ring gear 53 from being pushed backwards by the steel balls 72 of the clutch mechanism 7.

A cylindrical intermediate output shaft 56 is fixedly secured to the front side of the third carrier 55 of the third planetary reduction unit 5 so that the torque of the third carrier 55 can be transferred to the intermediate output shaft 56.

The rear end of the drive shaft 8 engages with the front end of the intermediate output shaft 56 against relative rotation so that the torque of the intermediate output shaft 56 can be transferred to the drive shaft 8. Alternatively, the third carrier 55 and the intermediate output shaft 56 may be formed into a single unit.

The rear end portion of a connector sleeve 43 is fixed to the inner circumference of the power transfer carrier 42. The connector sleeve 43 and the third sun gear 51 are rotated as a unit. The front end portion of the connector sleeve 43 is rotatably inserted through the inner circumference of the intermediate output shaft 56.

Responsive to the sliding movement of the power transfer carrier 42, the connector sleeve 43 is slid together with the third sun gear 51.

The connector sleeve 43 includes an intermediate shaft direct-coupling portion 431 formed on the outer circumferential surface of the front end portion thereof. The intermediate output shaft 56 includes a direct-coupling engagement portion 561 provided in the rear section of the inner circumference thereof. The intermediate shaft direct-coupling portion 431 of the connector sleeve 43 engages with the direct-coupling engagement portion 561 of the intermediate output shaft 56 against relative rotation.

The engagement between the intermediate shaft direct-coupling portion 431 and the direct-coupling engagement portion 561 is permitted only when the power transfer carrier 42 is moved from the front position to the rear position to have the third sun gear 51 disengaged from the third planetary gears 52.

If the intermediate shaft direct-coupling portion 431 and the direct-coupling engagement portion 561 are coupled together, the torque of the power transfer carrier 42 is directly transferred to the intermediate output shaft 56 without passing through the third planetary reduction unit 5. In this coupling state, the third planetary reduction unit 5 is kept in a non-reduction state and a non-use state in which no torque is transferred, thereby deactivating the clutch mechanism 7.

If the third shift handle 142 is operated to move the power transfer carrier 42 from the rear position to the front position, the intermediate shaft direct-coupling portion 431 and the direct-coupling engagement portion 561 are disengaged from each other. At this time, the third sun gear 51 comes into engagement with the third planetary gears 52. Accordingly, the third planetary reduction unit 5 is turned to a reduction state, consequently activating the clutch mechanism 7.

Retainer plates 17 that keep the second carrier 35, the second ring gear 33 and the third planetary gears 52 from falling into the movement space in which the power transfer carrier 42 makes sliding movement are provided at the axial opposite ends of the movement space of the power transfer carrier 42. The position of the retainer plates 17 is decided by the retainer pins 16 arranged on the front side of the second ring gear 33. It goes without saying that the third sun gear 51 and the connector sleeve 43 may be integrally formed with the power transfer carrier 42.

The drive shaft 8 to which torque is transferred from the intermediate output shaft 56 has an axially extending bore defined on the inner circumference thereof. A changeover pin 45 is rotatably and axially slidably arranged inside the bore of the drive shaft 8 in a concentric relationship with the drive shaft 8.

The changeover pin 45 is provided at its front end with a connector piece 44 that serves as a changeover unit for changing over the impact mode and the drill driver mode. The connector piece 44 is rotatable but axially immovable with respect to the changeover pin 45.

The drive shaft 8 includes a drive shaft side engagement portion 81 provided in the bore thereof. The anvil 91 includes an anvil side engagement portion 92. The connector piece 44 can engage with the drive shaft side engagement portion 81 and the anvil side engagement portion 92 in an axially slidable manner against relative rotation.

Although the engagement portions 81 and 92 provided in the drive shaft 8 and the anvil 91 are relatively rotatable without interfering with each other, they can be interconnected by the connector piece 44 against relative rotation.

More specifically, if the connector piece 44 engages with both the drive shaft side engagement portion 81 and the anvil side engagement portion 92, the engagement portions 81 and 92 are kept against relative rotation by the connector piece 44. Thus, the drive shaft 8 and the anvil 91 are connected to each other. If one of the engagement portions 81 and 92 is disengaged from the connector piece 44, the drive shaft 8 and the anvil 91 come into a relatively rotatable state again.

The rear end of the changeover pin 45 is press-fitted into the front end of the connector sleeve 43 to rotate together with the power transfer carrier 42. The changeover pin 45 and the connector sleeve 43 are slid forwards and backwards along with the sliding movement of the power transfer carrier 42.

As the changeover pin 45 is slid forwards and backwards, the connector piece 44 comes into either a state in which the connector piece 44 engages with only the drive shaft side engagement portion 81 and not the anvil side engagement portion 92 or a state in which the connector piece 44 engages with both the drive shaft side engagement portion 81 and the anvil side engagement portion 92.

In the state in which the connector piece 44 engages with only the drive shaft side engagement portion 81, the engagement portions 81 and 92 can make relative rotation and the torque of the drive shaft 8 is transferred to the anvil 91 and the output shaft 9 through the impact mechanism 6. This establishes an impact mode in which a task is performed with an intermittently-applied rotational impact force.

In the state in which the connector piece 44 engages with both the drive shaft side engagement portion 81 and the anvil side engagement portion 92, the drive shaft 8 and the anvil 91 are interconnected against relative rotation and the torque of the drive shaft 8 is directly transferred to the anvil 91 and the output shaft 9 without passing through the impact mechanism 6. In this state, the hammer 61 and the anvil 91 are always kept against relative rotation regardless of the magnitude of load acting on the output side. This establishes a drill driver mode in which a task is performed with a continuously-applied rotational force.

The connector piece 44 is rotatable with respect to the changeover pin 45 which in turn remains rotatable with respect to the drive shaft 8. Therefore, even when the rotational speed of the changeover pin 45 becomes different than that of the connector piece 44 or the drive shaft 8, there is no possibility that the changeover pin 45 is twisted and severed or the connector piece 44 and the engagement portions 81 and 92 are damaged.

In the impact mode set forth above, the connector piece 44 may engage with only the anvil side engagement portion 92 and not the drive shaft side engagement portion 81. The shape of the connector piece 44 may be suitably changed insofar as such change does not hinder the operation of the impact mechanism 6 in the impact mode nor cause the impact operation to be performed in the drill driver mode.

Description will now be made on the reduction and non-reduction states of the respective speed changer units in the impact mode and the drill driver mode and on the three speed modes, i.e., the high, middle and low speed modes established by the combination of the reduction and non-reduction states of the respective speed changer units.

As shown in FIG. 3, the impact mode refers to the state in which the second shift handle 141 and the third shift handle 142 are all positioned at the rear side. In the impact mode, the second ring gear 33 and the power transfer carrier 42 lie in the rear position. This establishes a high speed mode in which the second planetary reduction unit 3 is in the reduction state and the third planetary reduction unit 5 is in the non-reduction state.

Since the power transfer carrier 42 is in the rear position, the changeover pin 45 is moved backwards. As a result of the backward movement of the changeover pin 45, the connector piece 44 is disengaged from the anvil side engagement portion 92 so that the impact mechanism 6 can work.

The third sun gear 51 is kept out of engagement with the third planetary gears 52, as a result of which no torque is applied to the third ring gear 53. Thus, the clutch mechanism 7 does not work during the impact mode. This eliminates the need to perform an additional operation which would otherwise be needed to deactivate the clutch mechanism 7.

If the third shift handle 142 is operated in the impact mode to move forward while keeping the second shift handle 141 stationary as shown in FIG. 2, the power transfer carrier 42 is moved to the front position. As a result, the third sun gear 51 comes into engagement with the large-diameter gear portions 521 of the third planetary gears 52, thereby bringing the third planetary reduction unit 5 into a reduction state. The forward movement of the power transfer carrier 42 results in forward movement of the changeover pin 45. Therefore, the connector piece 44 engages with the anvil side engagement portion 92 as well as the drive shaft side engagement portion 81, thereby interconnecting the drive shaft 8 and the anvil 91 against relative rotation. Accordingly, the impact mode is converted to a drill driver mode.

At this time, the planetary reduction units 2, 3 and 5 are all in the reduction state. This establishes the low speed mode of the three speed modes. In other words, there is established a drill driver low mode in which large-diameter holes can be drilled as in the low speed mode of the conventional drill-driver-single-function rotary tool. Needless to say, the clutch mechanism 7 serves as a torque clutch because the third planetary reduction unit 5 is operated as a reduction unit.

If the second shift handle 141 is operated forward in the low speed mode as shown in FIG. 1, the second ring gear is moved to the front position. Thus, the second planetary reduction unit 3 is converted to a non-reduction state.

As a result, only the reduction ratio of the second planetary reduction unit 3 is changed while the drill driver mode remains unchanged. This establishes a drill driver high mode in which the rotary impact tool rotates faster than in the drill driver low mode. In the drill driver high mode, screws can be tightened as in the high speed mode of the conventional drill-driver-single-function rotary tool.

If the reduction ratio of the second planetary reduction unit 3 is smaller than that of the third planetary reduction unit 5 in the present rotary impact tool, the drill driver high mode becomes the middle speed mode of the three speed modes and the impact mode becomes the high speed mode.

In the present embodiment, the reduction ratio of the first planetary reduction unit 2 is set equal to, e.g., about 1/3.3, the reduction ratio of the second planetary reduction unit 3 being equal to, e.g., about 1/3 and the reduction ratio of the third planetary reduction unit 5 being equal to, e.g., about 1/6.

As a consequence, the reduction ratio in the drill driver high mode is about 1/20, the reduction ratio in the impact mode being about 1/10. This means that the speed ratio between the high speed mode and the middle speed mode is approximately 1:2 which is the same as the ratio between the reduction ratios of the speed changer units kept in the reduction state during the high speed mode and the middle speed mode.

The reduction ratio in the drill driver low mode, i.e., in the low speed mode, is about 1/60 and the ratio between the reduction ratios of the high speed mode and the low speed mode is approximately 1:6. If the reduction ratio of the second planetary reduction unit 3 is greater than that of the third planetary reduction unit 5, the drill driver high mode becomes the high speed mode and the impact mode becomes the middle speed mode.

Referring to FIG. 5, each of the third planetary gears 52 includes a small-diameter gear member 58 formed of a spur gear and a large-diameter gear member 57 made of a spur gear, both of which are coupled together. The teeth number of the large-diameter gear member 57 is equal to the natural-number multiple of the teeth number of the small-diameter gear member 58. The large-diameter gear member 57 has an outer diameter greater than that of the small-diameter gear member 58 (or 522).

A polygonal engagement protrusion 581 extends axially from one axial end surface, i.e., one planar surface, of the small-diameter gear member 58. An axially-opened polygonal engagement hole 571 for receiving the engagement protrusion 581 is formed in the planar surface of the large-diameter gear member 57. As the engagement protrusion 581 and the engagement hole 571 come into engagement with each other, the small-diameter gear member 58 and the large-diameter gear member 57 are fixed to each other against relative movement in a concentric relationship with the axis of rotation. At this time, the planar surface of the small-diameter gear member 58 faces toward and makes contact with the corresponding planar surface of the large-diameter gear member 57.

Figure 5A:
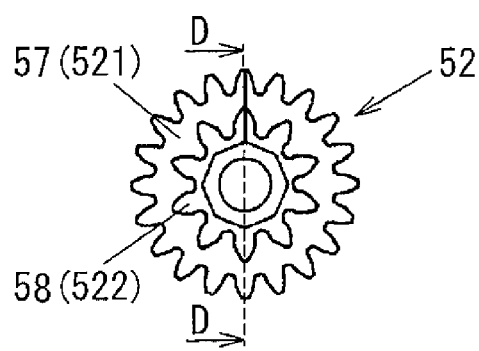
FIGS. 5A through 5D illustrate a third planetary gear employed in the third planetary reduction unit, FIG. 5A showing a large-diameter gear member and a small-diameter gear member coupled together, FIG. 5B showing only the large-diameter gear member, FIG. 5C showing only the small-diameter gear member, and FIG. 5D being a section view taken along line D-D in FIG. 5A.
Figure 5B:
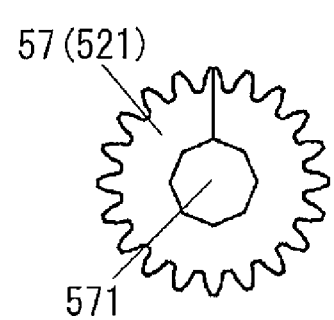
Figure 5C:
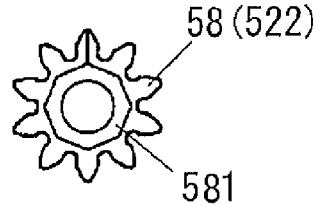
Figure 5D:
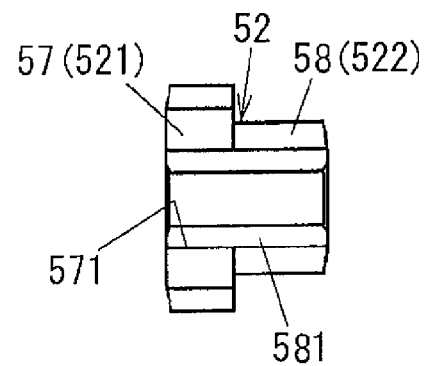
Figure 6:
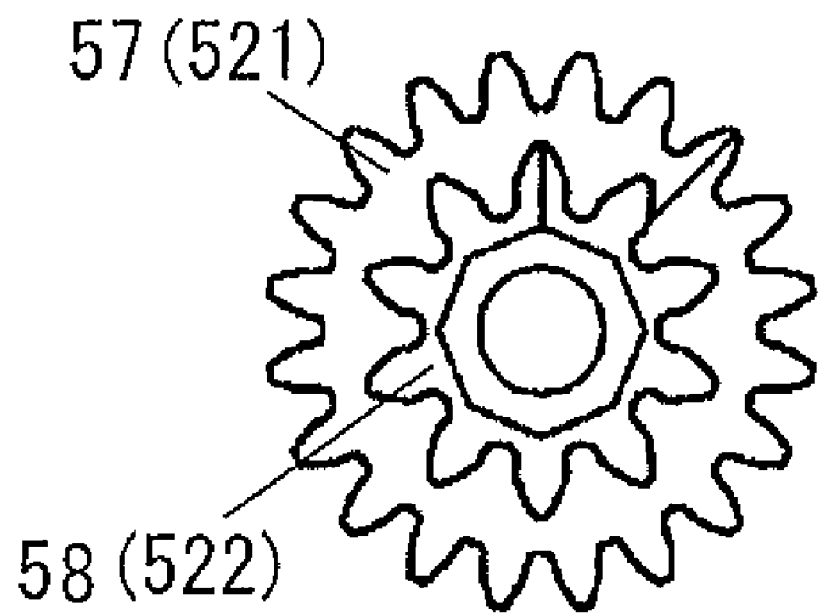
FIG. 6 is a view illustrating the large-diameter gear member and the small-diameter gear member coupled together at a slightly deviated relative angle.

The engagement protrusion 581 and the engagement hole 571 have the shape of an equilateral polygon, the respective sides of which are substantially equal to one another. This makes it possible to couple the small-diameter gear member 58 (or 522) to the large-diameter gear member 57 (or 521) together in a state in which the tip ends of the teeth of the gear members 56 and 57 are aligned with each other as illustrated in FIG. 5A. The relative angle between the small-diameter gear member 58 (or 522) and the large-diameter gear member 57 (or 521) may be changed so that the tip ends of the teeth of the small-diameter gear member 58 can be aligned with the inter-teeth valleys of the large-diameter gear member 57 as illustrated in FIG. 6. Moreover, the tip ends of the teeth of the small-diameter gear member 58 may be alternately aligned with the tip ends and inter-teeth valleys of the large-diameter gear member 57 in a specified period. The relative angle between the gear members 56 and 57 can be easily changed in conformity with the desired reduction ratio.

In the present embodiment, the loss of transferred torque is suppressed by forming each of the stepped planetary gears with separable members. Thus, the engagement protrusion 581 of substantially regular octagon shape is provided at its center with a bore into which each of the third transfer shafts 54 are inserted. Alternatively, the engagement protrusion 581 may be replaced by a plurality of protrusions formed on the outer circumference of the bore at an equal interval about the axis of rotation. As a further alternative, the engagement protrusion 581 may be provided in the large-diameter gear member 57 insofar as it is possible to prevent the increase in size and minimize the loss of transferred torque while obtaining the strength required for the stepped planetary gears to serve as a speed reduction mechanism. The shape of the engagement protrusion 581 and the engagement hole 571 can be suitably changed depending on the design considerations.

By realizing two-stage speed reduction in the impact mode as set forth above, it is possible to obtain a reduction ratio of about 1/10 which is greater than the reduction ratio of from about 1/7 to 1/8 available in the conventional impact mode in which speed reduction is performed in a single stage. This makes it possible to use a motor whose torque is smaller than that of the conventional motor, which assists in reducing the size of the motor 13. In addition, the outer diameter of the multi-stage speed reduction mechanism can be made smaller than that of the conventional mechanism in which a reduction ratio of about 1/10 is achieved by single-stage reduction. This helps minimize the increase in size.

The strength required in the present planetary reduction mechanism is not greater than that required in the conventional reduction mechanism in which the desired reduction ratio in the impact mode is obtained through single stage reduction. Accordingly, it is possible to suppress an increase in the outer diameter and total length of the multi-stage speed reduction mechanism. Even when the performance in the impact mode is improved, it is possible to minimize the increase in the overall size of the rotary impact tool.

No speed change is performed in the first planetary reduction unit of the multi-stage speed reduction mechanism that directly receives torque from the motor 13 and rotates at a high speed. Therefore, when the modes are changed over, the respective gears of the first planetary reduction unit do not make any axial movement that should otherwise be made to perform a mode changing operation. This helps prevent the gears from suffering from damage or other trouble during the mode changing operation. Furthermore, this assists in enhancing the ease of use and preventing the increase in size which would otherwise be required to increase the strength of the respective gears.

The multi-stage speed reduction mechanism is capable of establishing three different speeds, one for the impact mode and the remaining two for the drill driver mode. This makes it possible to set the drill driver mode with a reduction ratio closer to that of the conventional drill-driver-single-function rotary tool.

Thanks to this feature, it is possible to set, as the drill driver mode, both a drill driver low mode in which large-diameter holes can be drilled as in the low speed mode of the conventional drill-driver-single-function rotary tool and a drill driver high mode in which screws can be tightened as in the high speed mode of the conventional rotary tool and in which the rotary impact tool does not easily come into a locked state even if the load thereof is increased. This helps enhance the ease of use of the present rotary impact tool as a multi-purpose rotary impact tool having an impact mode and a drill driver mode.

In the conventional multi-purpose rotary impact tool, the ratio between the reduction ratios of the impact mode and the drill driver mode is about 1:3. In the present rotary impact tool, however, the ratio between the reduction ratios of the impact mode, the drill driver high mode and the drill driver low mode is approximately 1:2:6 if the high speed mode is used as the impact mode. This enables the present rotary impact tool to operate in the drill driver mode with the output torque closer to that of the special-purpose tool for drill driver use having a high speed mode and a low speed mode.

The speed changer unit brought into the reduction state in the high speed mode differs from the speed changer unit that comes into the reduction state in the middle speed mode. This ensures that the speed ratio between the high speed mode and the middle speed mode becomes the same as the ratio between the reduction ratios of the speed changer units kept in the reduction state during the high speed mode and the middle speed mode. This makes it easy to set the reduction ratios in the impact mode and the drill driver mode. Accordingly, the ratio between the speed ratios of the impact mode and the drill driver mode can be set equal to a desired value. Furthermore, the operating condition in the drill driver mode can be set closer to the operating condition of the special-purpose tool having only a drill driver function. This enhances the ease of use of the present rotary impact tool.

Preferably, the ratio between the speed ratios of the impact mode and the drill driver high mode is set equal to about 1:2. In the conventional rotary impact tool, the ratio between the speed ratios of the impact mode and the drill driver mode is no more than 1:3. This has been one of the causes that reduce the performance in the drill driver mode in which screws are tightened at a low speed.

The middle speed changer unit of the two high speed and middle speed changer units, which stays in the reduction state during the middle speed mode, is formed of a IV-type planetary gear unit. By changing the number of teeth of the stepped planetary gears, the reduction ratio of the middle speed changer unit can be made greater than the reduction ratio of the conventional planetary reduction mechanism in which a sun gear and a ring gear have the same pitch circle diameter. Therefore, the middle speed changer unit whose reduction ratio needs to be greater than that of the high speed changer unit staying in the reduction state during the high speed mode can be designed to have substantially the same outer diameter as that of the high speed changer unit. This makes it possible to minimize the increase in overall size.

More specifically, if the reduction ratio of the IV-type planetary gear unit is assumed to be about 1/6, the reduction ratio of the conventional planetary reduction mechanism in which a sun gear and a ring gear have the same pitch circle diameter is nothing more than 1/4. In case where the conventional planetary reduction mechanism is designed to have the same reduction ratio as that of the IV-type planetary gear unit, a problem occurs in the strength of the respective gears. Moreover, there occurs a need to increase the outer diameter of the ring gear and the total length of the reduction mechanism. This may possibly result in an increase in the overall size of the rotary impact tool.

The IV-type planetary gear unit is employed in the final or third planetary reduction unit 5. Therefore, the third planetary gears 52 and the third sun gear 51 can be assembled with ease even when the third ring gear 53 having the clutch ridges 71 of the clutch mechanism 7 is assembled first. This is because the third planetary gears 52 are of the stepped type and because the small-diameter gear portions 522 of the third planetary gears 52 engage with the third ring gear 53. Use of the IV-type planetary gear unit makes it easy to perform maintenance and repair, thereby making the rotary impact tool easily usable for a prolonged period of time.

The modes are changed over by the shift handles in the order of the high speed mode, the low speed mode and the middle speed mode. This means that the changeover operation between the neighboring modes is performed by shifting only one speed changer unit, which helps prevent the shift mechanism from becoming complicated. Accordingly, it is possible to suppress the increase in the size of the shift mechanism and to minimize the increase in the overall size of the rotary impact tool.

The shift operation can be performed only by operating one of the two shift handles. This eliminates the possibility that two or more speed changer units are simultaneously shifted, thereby reducing the likelihood of occurrence of trouble or other problems and making the rotary impact tool easily usable for a prolonged period of time.

According to the shift operation order, the low speed mode is positioned between the middle speed mode and the high speed mode. Therefore, the modes are changed over in the order of the impact mode, the drill driver low mode and the drill driver high mode. This provides an easy-to-use rotary impact tool capable of performing the changeover operation in the order of the magnitude of torque outputted from the main body. Needless to say, the two shift handles may be operated at one time to directly convert the impact mode to the drill driver high mode.

When converted to the impact mode, the third sun gear 51 of the final planetary reduction unit kept in the non-reduction state is disengaged from the third planetary gears 52. This makes it possible to bring the final planetary reduction unit into a non-use state in which no torque is applied thereto. Therefore, there is no need to provide an additional unit for deactivating the clutch mechanism 7. This helps suppress the increase in the overall size and make the rotary impact tool simple in structure.

The conversion between the operation and non-operation of the impact mechanism 6, which is important in changing over the impact mode and the drill driver mode, is performed by engaging and disengaging the connector piece 44 and the anvil 91. These engagement and disengagement operations of the connector piece 44 and the anvil 91 are linked to the shift operations of the speed changer units performed when changing over the impact mode and the drill driver mode.

Therefore, there is no need to provide an additional operating unit for performing the conversion between the operation and non-operation of the impact mechanism 6. The linkage mechanism consists of only the changeover pin 45 rotatably fitted to the drive shaft 8. This makes it possible to realize the linkage mechanism with a simple structure, thereby suppressing the increase in the overall size of the rotary impact tool.

In addition, it is possible to readily change over the impact mode and the drill driver mode without having to additionally perform the conversion between the activation and deactivation of the clutch mechanism 7 or the conversion between the operation and non-operation of the impact mechanism 6. This improves the ease of use of the rotary impact tool.

In the third planetary reduction unit 5 of the present embodiment, the ratio between the teeth number of the small-diameter gear portion 522 and the teeth number of the large-diameter gear portion 521 of each of the third planetary gears 52 is set equal to 1:natural number. This eliminates the need to adjust the positions of teeth when the small-diameter gear portion 522 is coupled to the third ring gear 53. Accordingly, it is possible to easily carry out the assembling work of the third planetary reduction unit 5.

The ratio between the number of the stepped planetary gears, the teeth number of the ring gear meshing with the stepped planetary gears and the teeth number of the sun gear meshing with the stepped planetary gears is set equal to 1:natural number:natural number. This makes it possible to equalize the relative angles between the large-diameter gear portions and the small-diameter gear portions of all stepped planetary gears. Thanks to this feature, it is possible to use common-type stepped planetary gears, which makes it easy to assemble the stepped planetary gears and improves the ease of use.

Each of the third planetary gears 52 is formed of the small-diameter gear portion 522 and the large-diameter gear portion 521, both of which are coupled together so that the relative angle therebetween can be changed. Therefore, the reduction ratio can be changed by changing the teeth number and module of the third sun gear 51 and the teeth number and module of the large-diameter gear member 57.

Thanks to this feature, the task of changing the reduction ratio can be easily performed without having to replace the third ring gear 53 in which the clutch mechanism 7 is arranged. Furthermore, it becomes possible to easily change the middle speed mode to produce desired output torque.

Since the relative angle between the small-diameter gear portion 522 and the large-diameter gear portion 521 is adjustable, it is possible to easily provide a stepped planetary gear differing in relative angle from the remaining stepped planetary gears if such a need exists. It is also possible to easily assemble the third planetary reduction unit 5, i.e., the IV-type planetary gear unit.

The rotational axes of the multi-stage speed reduction mechanism, the clutch mechanism 7, the drive shaft 8 and the output shaft 9 are all arranged in a concentric relationship with the motor 13. This assists in suppressing the increase in the overall size of the rotary impact tool.

Figure 7A:
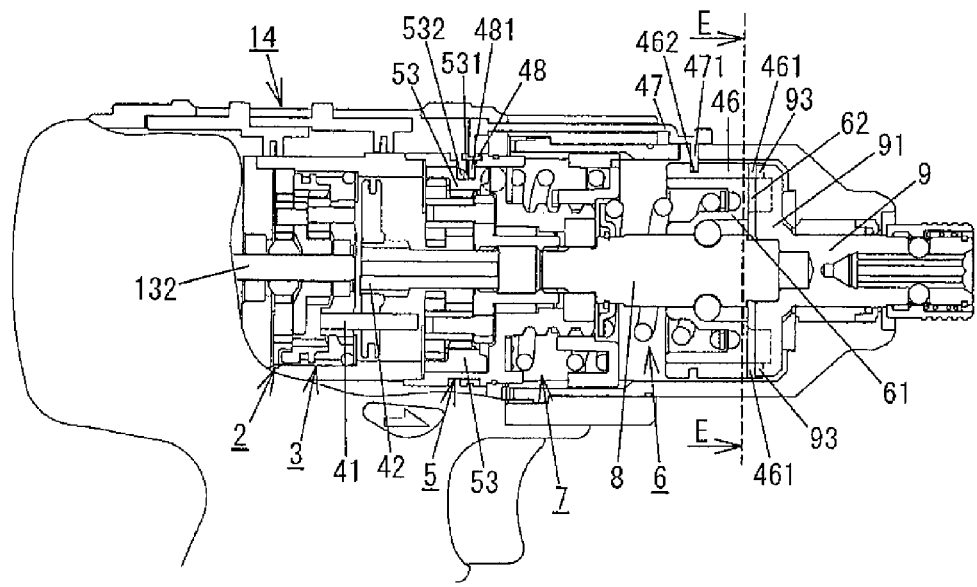
FIGS. 7A and 7B are views showing a rotary impact tool in accordance with a second embodiment of the present invention, FIG. 7A illustrating the rotary impact tool in a drill driver mode, and FIG. 7B illustrating the rotary impact tool in an impact mode.
Figure 7B:
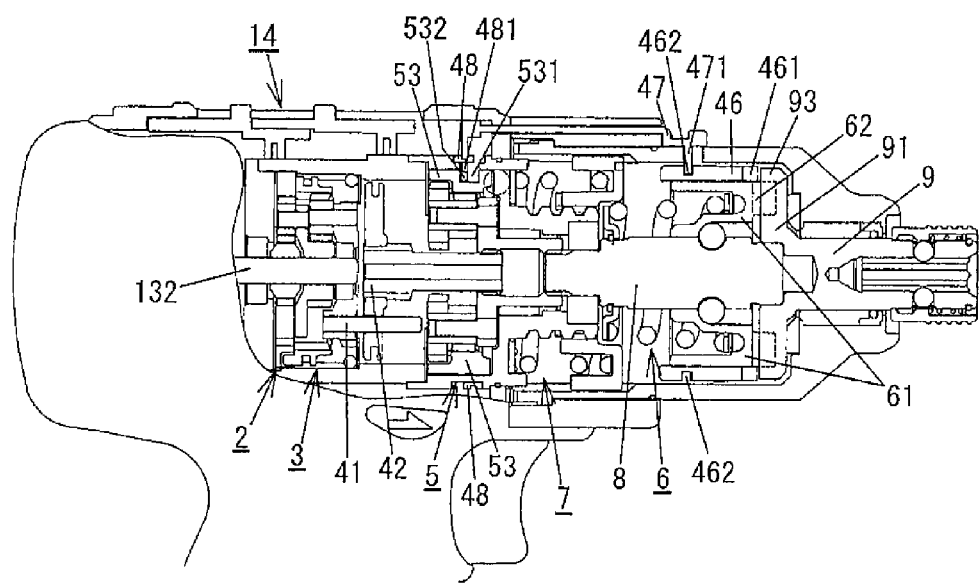

Referring to FIGS. 7A and 7B, there is shown a rotary impact tool in accordance with a second embodiment of the present invention. In place of the connector piece 44 and the changeover pin 45 for interconnecting the drive shaft 8 and the anvil 91 against relative rotation, engagement portions 611 and 93 are provided on the outer circumferences of the hammer 61 and the anvil 91 and a connector member is provided which can engage with the engagement portions 611 and 93. The present embodiment is directed to claim 9. Only the differing points of the second embodiment from the first embodiment will be described with the common configurations omitted from description.

Figure 8:
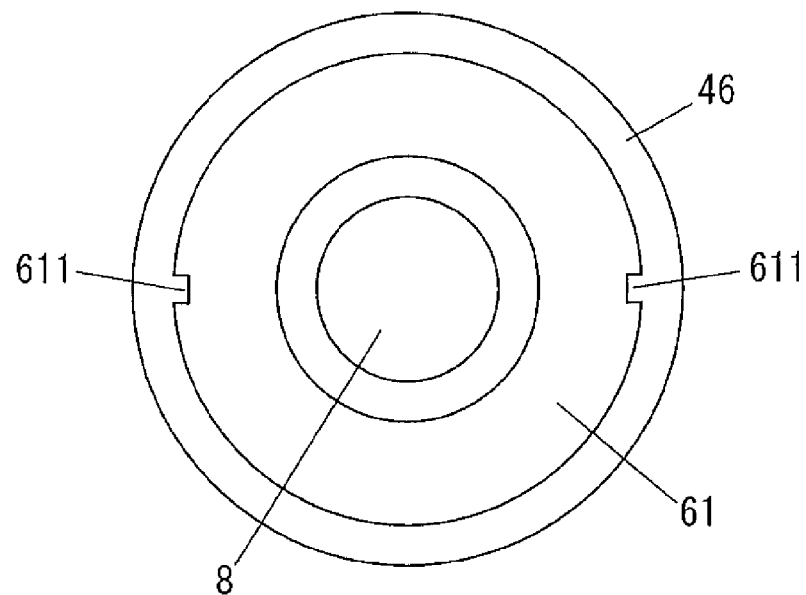
FIG. 8 is a section view of the rotary impact tool taken along line E-E in FIG. 7A.

The connector member is a hammer ring 46 slidably engaging with the outer circumference of the hammer 61 and engaging with the engagement portion 611 of the hammer 61 against relative rotation at all times as shown in FIG. 8. An interlock operation portion 47 is provided so that it can slide forwards and backwards in an axial direction. Upon operating the interlinking operation portion 47 from the outside, the hammer ring 46 is slid forwards or backwards together with the interlock operation portion 47.

More specifically, the hammer ring 46 is provided with a ring groove 462 on its outer circumference. The interlock operation portion 47 is provided with an engagement piece 471 whose width is substantially equal to the axial width of the ring groove 462. The engagement piece 471 is arranged inside the ring groove 462. If the interlock operation portion 47 is slidingly moved forwards or backwards, the hammer ring 46 makes sliding movement in the forward or backward direction.

Since the ring groove 462 has an annular shape, the engagement between the engagement piece 471 and the ring groove 462 is not released even when the hammer ring 46 engaging with the engagement piece 471 rotates together with the hammer 61. At this time, the interlock operation portion 47 does not make rotation.

The hammer ring 46 is provided at its front end with a hammer ring claw 461 releasably engageable with the engagement portion 93 of the anvil 9. The hammer ring claw 461 is provided flush with the surface of the protrusion 62 of the hammer 61 that makes contact with the anvil 91.

If the hammer ring 46 is caused to slide forwards by operating the interlock operation portion 47, the hammer ring claw 461 comes into engagement with the engagement portion 93 of the anvil 91 against relative rotation. At this time, the hammer ring claw 461 rotates together with the anvil 91 at all times, which prevents the hammer 61 from making backward movement. This establishes the drill driver mode in which the impact mechanism 6 is kept inoperable.

If the hammer ring 46 is caused to slide backwards by operating the interlock operation portion 47, the hammer ring claw 461 is disengaged from the engagement portion 93 of the anvil 91. As a result, only the protrusion 62 of the hammer 61 and the anvil 91 engage with each other. This establishes the impact mode in which the impact mechanism 6 can work.

There is a need to deactivate the clutch mechanism 7 in the impact mode. To this end, a clutch fixing ring 48 that does not rotate with respect to the housing 1 but can slide together with the interlock operation portion 47 is arranged at the rear end of the interlock operation portion 47.

The clutch fixing ring 48 is releasably engageable with the engagement portion provided on the outer circumference of the third ring gear 53 of the third planetary reduction unit 5 which includes the clutch mechanism 7. The clutch mechanism 7 is activated or deactivated by bringing the clutch fixing ring 48 into engagement or out of engagement with the engagement portion.

Figure 9:
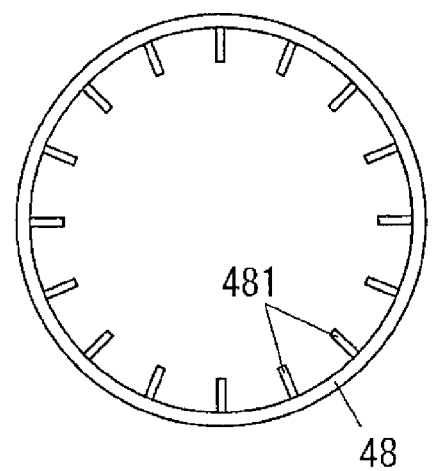
FIG. 9 illustrates a clutch retainer ring employed in the rotary impact tool.

More specifically, as shown in FIG. 9, the clutch fixing ring 48 includes a plurality of claws 481 arranged on its inner circumference at a regular interval. The claws 481 are engageable and disengageable with the engagement portion of the third ring gear 53. The engagement portion of the third ring gear 53 includes an annular recess portion 531 opened radially outwards. The third ring gear 53 includes an outer gear 532 arranged at the rear side of the recess portion 531.

When the claws 481 of the clutch fixing ring 48 are positioned within the recess portion 531 and the clutch fixing ring 48 is slid backwards, the claws 481 come into engagement with the outer gear 532 of the recess portion 531. Thus, the third ring gear 53 is fixed to the housing 1 against rotation, eventually deactivating the clutch mechanism 7.

If the clutch fixing ring 48 is slid forwards in this state, the claws 481 are disengaged from the outer gear 532. Thus, the third ring gear 53 becomes rotatable with respect to the housing 1, thereby activating the clutch mechanism 7.

In the present embodiment, therefore, it is possible to change over the activation and deactivation of the impact mechanism 6 independently of the shifting operation of the multi-stage speed reduction mechanism. This means that the three speeds are available in each of the impact mode and the drill driver mode, which assists in improving the ease of use of the rotary impact tool.

Needless to say, the engagement and disengagement between the intermediate shaft direct-coupling portion 431 and the direct-coupling engagement portion 561 remains effective. Although the activation and deactivation of the impact mechanism 6 is not changed over by this engagement and disengagement, it is still possible to change over the reduction and non-reduction of the third planetary reduction unit 5 and the activation and deactivation of the clutch mechanism 7.

Figure 10A:
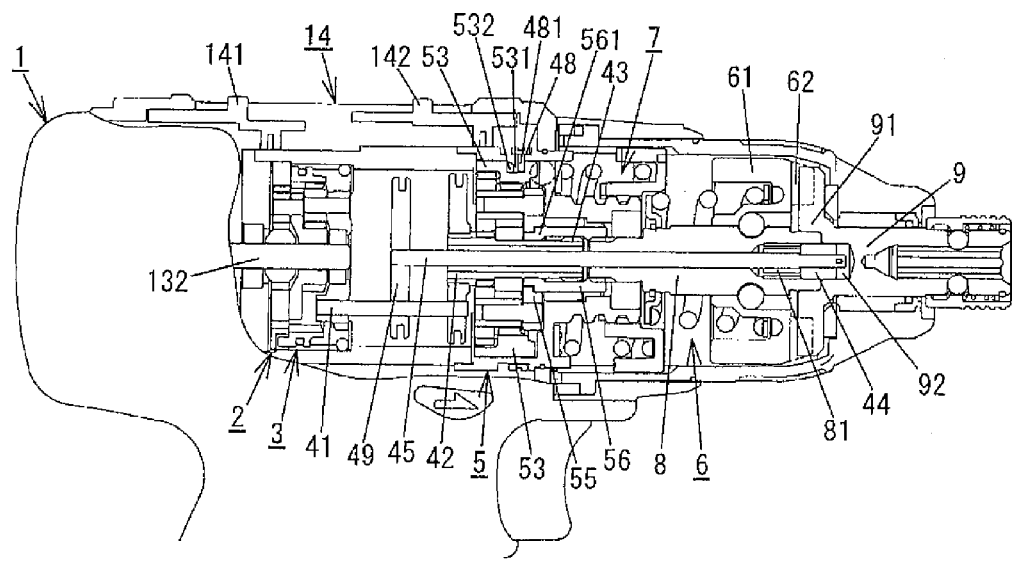
FIGS. 10A and 10B are views showing a rotary impact tool in accordance with a third embodiment of the present invention, FIG. 10A illustrating the rotary impact tool in a low-speed drill driver mode, and FIG. 10B illustrating the rotary impact tool in a high-speed impact mode.
Figure 10B:
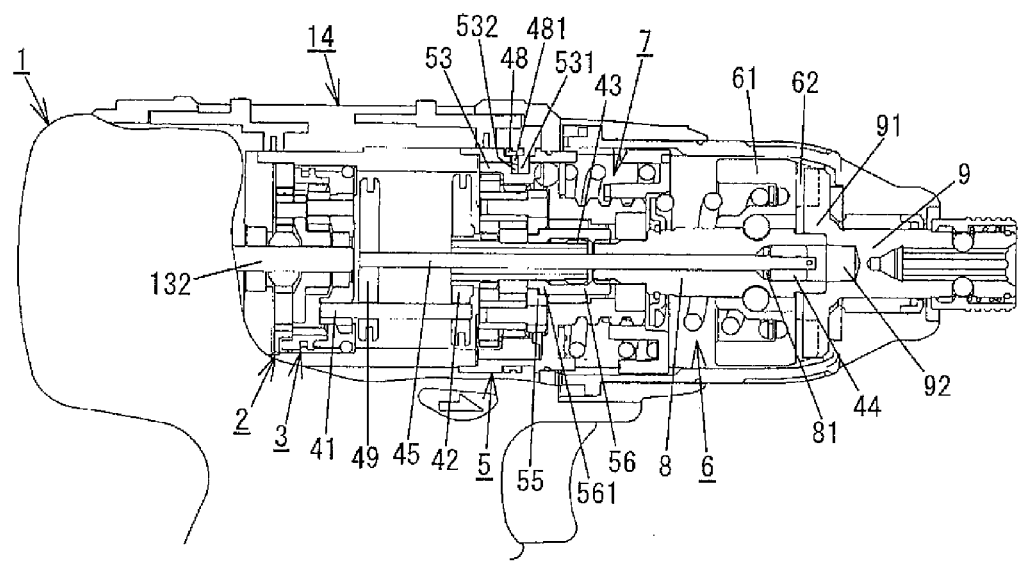

Referring to FIGS. 10A and 10B, there is shown a rotary impact tool in accordance with a third embodiment of the present invention. In the present embodiment, the changeover between the impact mode and the drill driver mode performed by the connector piece 44 in the first embodiment is combined with the changeover of the clutch mechanism 7 performed by the clutch fixing ring 48 in the second embodiment. Only the differing points of the third embodiment from the first and second embodiments will be described with the common configurations omitted from description.

In the present embodiment, a mode converter member 49 slidable along the power transfer pins 41 is additionally installed in the space in which the power transfer carrier can make sliding movement with respect to the power transfer pins 41. The changeover pin 45 is press-fitted to the mode converter member 49. This means that the changeover pin 45 is rotatable with respect to the power transfer carrier 42 and the connector sleeve 43.

The mode converter member 49 and the clutch fixing ring 48 can be slid forwards and backwards by a mode-converting operation unit (not shown). If the clutch fixing ring 48 slides backwards, so does the mode converter member 49.

At this time, the clutch mechanism 7 is deactivated by the movement of the clutch fixing ring 48. Furthermore, the changeover pin 45 slides backwards and the connector piece 44 engages with only the drive shaft side engagement portion 81, thereby establishing the impact mode.

If the mode-converting operation unit is operated from the outside in the impact mode so that the clutch fixing ring 48 can slide forwards to activate the clutch mechanism 7, the mode converter member 49 is also slid forwards. At this time, the connector piece 44 engages with the anvil side engagement portion 92, whereby the impact mode is converted to the drill driver mode. The power transfer carrier 42 is slidable forwards and backwards without interfering with the mode converter member 49. This makes it possible to change over the third planetary reduction unit 5 between a shifting state and a non-shifting state.

Therefore, the speed-changing operation performed by the shift operation unit 14 is independent of the changeover operation between the impact mode and the drill driver mode performed by the mode-converting operation unit. This makes it possible to realize three speeds in each of the impact mode and the drill driver mode, thereby improving the ease of use of the rotary impact tool.

The number of the speed changer units is not limited to two but may be three or more so that two or more speeds can be available in the impact mode and three or more speeds in the drill driver mode. The design of the multi-stage speed reduction mechanism may be appropriately changed, insofar as it is always possible to reduce the speed in two or more stages and to change the speed in three or more speed ratios through the use of at least one speed reducer unit and at least one speed changer unit in the respective modes and insofar as it is possible to obtain the advantageous effects of the present invention.

It goes without saying that the operation units such as the shift operation unit 14 and the mode-converting operation unit are not limited to the axially slidable type but may be of a circumferentially rotatable type in which the rotational movement is translated into axial sliding movement through a cam. The design of the operation units may be suitably changed insofar as it is possible to obtain the advantageous effects of the present invention.

While the invention has been shown and described with respect to the embodiments, it will be understood by those skilled in the art that various changes and modification may be made without departing from the scope of the invention as defined in the following claims.

What is claimed is:

1. A rotary impact tool comprising:
   a motor for producing rotational power;
   an output shaft for receiving the rotational power;
   an impact mechanism including a hammer and an anvil;
   a changeover unit for changing over an impact mode in which the impact mechanism is operated and a drill driver mode in which the rotational power produced by the motor is transferred to the output shaft without operating the impact mechanism; and
   a multi-stage speed reduction mechanism for transferring the rotational power produced by the motor to the output shaft at variable speeds in at least three speed modes including a low speed mode, a middle speed mode and a high speed mode,
   wherein the multi-stage speed reduction mechanism includes at least two planetary speed changer units shiftable between a reduction state and a non-reduction state and at least one speed reducer unit operable in a reduction state at all times, at least one of the three speed modes being used as the impact mode, at least two of the three speed modes being used as the drill driver mode, each of the three speed modes being established through a speed reduction operation of at least two stages in which the speed reducer unit and at least one of the speed changer units are kept in the reduction state such that the impact mode is established through a speed reduction operation of at least two stages.

2. The rotary impact tool of claim 1, wherein one of the two planetary speed changer units comes into the reduction state in the middle speed mode and the other comes into the reduction state in the high speed mode, the speed ratio between the high speed mode and the middle speed mode being set equal to the ratio between the reduction ratios of the two planetary speed changer units.

3. The rotary impact tool of claim 2, wherein the planetary speed changer unit coming into the reduction state in the middle speed mode comprises a IV-type planetary gear unit including a sun gear, a ring gear and a stepped planetary gear, the stepped planetary gear including a large-diameter gear portion and a small-diameter gear portion, the large-diameter gear portion differing in teeth number and outer diameter from the small-diameter gear portion, the large-diameter gear portion engaging with the sun gear, the small-diameter gear portion engaging with the ring gear.

4. The rotary impact tool of claim 1, wherein the speed reducer unit is a first planetary reduction unit arranged near the motor in the multi-stage speed reduction mechanism.

5. The rotary impact tool of claim 1, further comprising a drive shaft being driven by the rotational power supplied from the motor, wherein the changeover unit includes engagement portions respectively provided in the anvil and the drive shaft engaging with the hammer and a connector member arranged to engage with the engagement portions, and wherein the drill driver mode and the impact mode are changed over by changing over a state in which the connector member engages with the engagement portions to interconnect the anvil and the drive shaft against relative rotation and a state in which the connector member does not engage with at least one of the engagement portions.

6. The rotary impact tool of claim 5, wherein at least one of the speed changer units is kept in the non-reduction state in the impact mode, the speed changer unit kept in the non-reduction being a final planetary reduction unit arranged near the output shaft in the multi-stage speed reduction mechanism, the final planetary reduction unit including a sun gear connected to the connector member of the changeover unit through an intermediate transfer member.

7. The rotary impact tool of claim 3, further comprising a drive shaft being driven by the rotational power supplied from the motor, wherein the changeover unit includes engagement portions respectively provided in the anvil and the drive shaft engaging with the hammer and a connector member arranged to engage with the engagement portions, and wherein the drill driver mode and the impact mode are changed over by changing over a state in which the connector member engages with the engagement portions to interconnect the anvil and the drive shaft against relative rotation and a state in which the connector member does not engage with at least one of the engagement portions, at least one of the speed changer units is kept in the non-reduction state in the impact mode, the speed changer unit kept in the non-reduction being a final planetary reduction unit arranged near the output shaft in the multi-stage speed reduction mechanism, the final planetary reduction unit including a sun gear connected to the connector member of the changeover unit through an intermediate transfer member, and the final planetary reduction unit kept in the non-reduction state in the impact mode comprises the IV-type planetary gear unit, the small-diameter gear portion being arranged on the output side of the IV-type planetary gear unit.

8. The rotary impact tool of claim 3, wherein the ratio between the teeth number of the small-diameter gear portion and the teeth number of the large-diameter gear portion of the stepped planetary gear is set equal to 1: natural number.

9. The rotary impact tool of claim 1, wherein the changeover unit includes engagement portions respectively provided in the anvil and the hammer and a connector member arranged to engage with the engagement portions, and wherein the drill driver mode and the impact mode are changed over by changing over a state in which the connector member engages with the engagement portions to keep the impact mechanism against relative rotation and a state in which the connector member does not engage with at least one of the engagement portions.

10. The rotary impact tool of claim 3, wherein the ratio between the number of the stepped planetary gear, the teeth number of the ring gear and the teeth number of the sun gear is set equal to 1: natural number:natural number.

11. The rotary impact tool of claim 3, wherein the small-diameter gear portion and the large-diameter gear portion of the stepped planetary gear are formed independently of each other so that the relative angle between the small-diameter gear portion and the large-diameter gear portion becomes adjustable.

12. The rotary impact tool of claim 1, wherein the three speed modes of the multi-stage speed reduction mechanism are changed over in the order of the middle speed mode, the low speed mode and the high speed mode.

* * * * *